United States Patent

Fukuda

[15] 3,680,957

[45] Aug. 1, 1972

[54] AUTOMATIC SPECTROPHOTOMETER

[72] Inventor: Yoshio Fukuda, Takatsuki, Japan

[73] Assignee: Shimadzu Seisakusho Ltd., Kyote Prefecture, Japan

[22] Filed: Aug. 14, 1970

[21] Appl. No.: 63,787

Related U.S. Application Data

[63] Continuation-in-part of Ser. No. 765,958, Oct. 8, 1968, abandoned.

[30] Foreign Application Priority Data

Oct. 10, 1967 Japan..........................42/65088

[52] U.S. Cl. ....................356/97, 250/207, 250/218
[51] Int. Cl...............................................G01j 3/42
[58] Field of Search ........250/207, 218, 226; 356/51, 356/96, 97

[56] References Cited

UNITED STATES PATENTS 3,589,814  6/1971  Patterson et al................356/96
2,984,146  5/1961  Kwart et al..................356/96 X
3,025,746  3/1962  Cary et al. .......................356/94
3,076,896  5/1963  Smith..........................250/207

Primary Examiner—Ronald L. Wibert
Assistant Examiner—F. L. Evans
Attorney—Wenderoth, Lind & Ponack

[57] ABSTRACT

A spectrophotometer so constituted that calibration of the photometric circuit can be automatically performed to attain quick and precise measurement. The dynode supply voltage of a photomultiplier in the spectrophotometer is controlled to adjust the sensitivity of the spectrophotometer in such a way that, when a reference sample is put in the path of monochromatic light to the photomultiplier, the amplified output of the photomultiplier becomes equal to the standard value. Then an unknown sample is put in said light path and the intensity of transmitted light is measured at the same photomultiplier sensitivity as is calibrated by the above-mentioned adjustment by setting the voltage supplied to the photomultiplier dynodes at the said adjusted value. Thus, the light absorption coefficient of the unknown sample as compared to that of the reference sample can be precisely as well as quickly measured.

4 Claims, 3 Drawing Figures

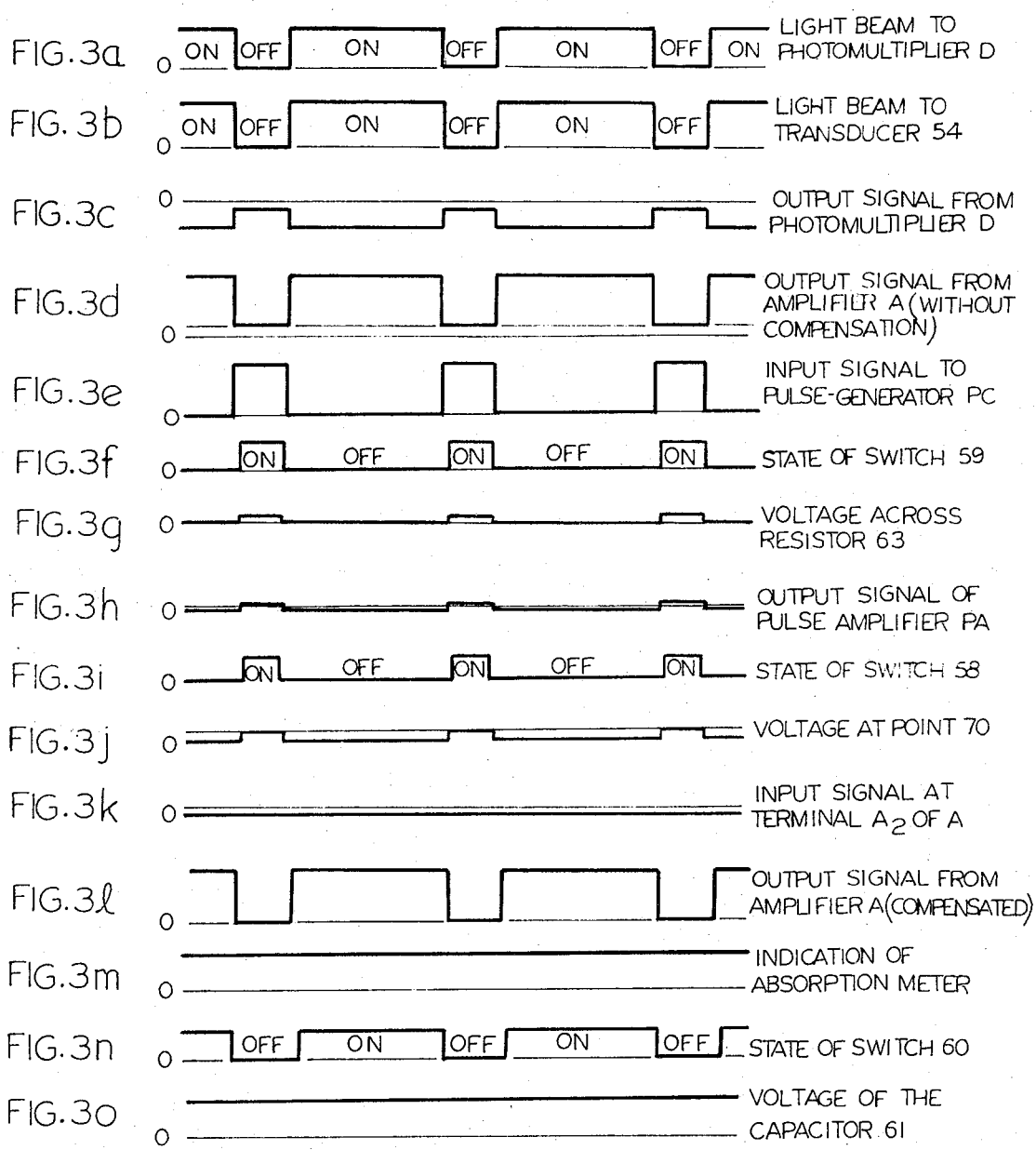

AUTOMATIC SPECTROPHOTOMETER

This is a continuation-in-part of application, Ser. No. 765,958, filed Oct. 8, 1968, now abandoned.

This invention relates to a novel spectrophotometer. More particularly, this invention relates to a novel single-beam spectrophotometer for use in measuring the light absorption coefficient of an unknown sample compared with that of a reference sample.

The spectrophotometer of this invention is a novel single beam spectrophotometer for use in measuring the light absorption coefficient of an unknown sample compared with that of a reference sample, and is constituted to enable automatic adjustment or calibration of a photometric circuit.

A single beam spectrophotometer needs a longer measuring time than a double beam spectrophotometer when the light absorption coefficient of an unknown sample is measured against a reference sample for each of a series of monochromatic lights of different wavelength. When, however, such light absorption coefficient is measured only for light of fixed wave length, the single beam spectrophotometer is able to perform the measurement with optically and electronically better signal-to-noise ratio than that of a double beam spectrophotometer for an equal measurement time. Therefore, the single beam spectrophotometer is especially suitable for precise quantitative analysis of samples in light of a fixed wavelength.

For applications in chemical engineering fields where many samples are analyzed during daily routine work, it is generally sufficient to measure the light absorption coefficient of said samples in light of a fixed wavelength. In such cases, the absorption coefficient of the unknown sample can be easily obtained on a directly readable meter by adjusting the parameters of the photometric circuit once for a reference sample, and afterwards by measuring unknown samples with the thus adjusted circuit. Consequently, single beam spectrophotometers are sometimes more suitable than double beam spectrophotometers in the chemical engineering field.

In a conventional method of measuring the absorption coefficient for an unknown sample with a single beam spectrophotometer, measurement is performed with the voltage supply to the photomultiplier in the spectrophotometer adjusted after having adjusted the parameters of the photometric circuit; e.g., said supply voltage is adjusted in such a way that the absorption meter indicates a standard value when the reference sample is put into the light path.

The said adjustment has heretofore been made manually, and consequently measurement errors have frequently been caused by discordances between the meter indication and the standard value. Prevention of such errors requires complicated measuring procedures, resulting in inefficient use of measuring time. Therefore, it should be very useful in experiments or in chemical engineering fields to have a single beam spectrophotometer, in which the measurement procedure is automatically performed as much as possible, so as to enable the spectrophotometer to obtain the absorption coefficient for desired light wavelengths in a short measuring time and as near as possible to the time required by a double beam spectrophotometer.

Therefore, one object of the present invention is to provide a novel spectrophotometer so constituted that it automatically standardizes the parameters in the photometric circuit.

Another object of the present invention is to provide a novel spectrophotometer so constituted that it is capable of precise and rapid measurement through automatic adjustment of the sensitivity of the photometric circuit.

The spectrophotometer of the present invention comprises means for emitting monochromatic light; means for alternatively inserting a reference sample and an unknown sample into the path of said light; transducer means for obtaining an electric output signal corresponding to the intensity of light transmitted through said samples inserted into said light path; means for indicating the intensity of said output signal; control means for controlling the sensitivity of said transducer means reacting to the controlling input signal; means for supplying a standard voltage to said control means for controlling the output to a predetermined standard level when the reference sample is inserted into said light path; memory means for memorizing the normal conditions of the transducer means at the standard sensitivity when a controlling input signal based on said reference voltage is applied to said control means; and means for connecting said memory means to said control means in order to return the said transducer means to the normal condition in accordance with the memory of said memory means when said unknown sample is placed in said light path instead of said reference sample.

There are other features and particulars of the present invention which will become clear from the following detailed description, taken together with the accompanying drawings, in which:

FIG. 3 is a series of graphs illustrating operating conditions of the spectrophotometer of FIG. 1.

Figure 1:
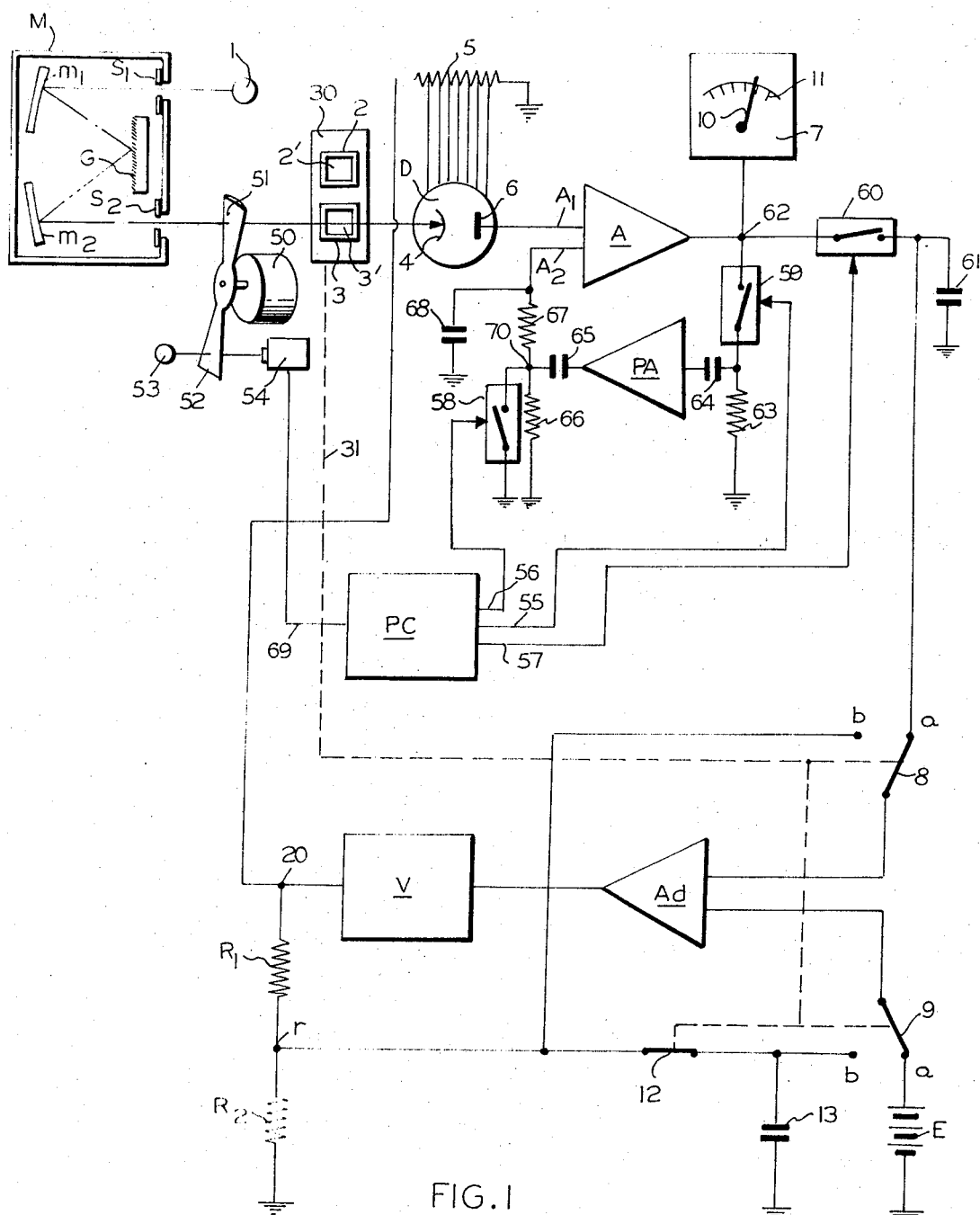
FIG. 1 is a schematic circuit diagram of the single beam spectrophotometer according to the present invention.

In FIG. 1, a light source 1 having a suitable radiation energy within the range of wavelengths to be measured can be, for instance, a hydrogen discharge lamp, an incandescent lamp, etc., according to the purpose of the measurement or the kind of samples. A diffraction grating type monochrometer M for obtaining the desired monochromatic light beam has a grating G and a housing with an incident slit $S_1$ and an emitting slit $S_2$. Prior to the measuring, the slits are manually set at proper slit widths. A light beam coming through the incident slit $S_1$ is reflected by a concave mirror $m_1$ toward the diffraction grating G. The angle or the position of the grating G can be adjusted by a known mechanism. The light diffracted by the grating G is reflected by the other concave mirror $m_2$ and emitted through the emitted slit $S_2$ as a monochromatic light beam. The wavelength of the monochromatic light emitted through said emitting slit $S_2$ can be varied by adjusting said angle or position of the grating G. When measurement is made with a monochromatic light beam of one or several fixed wavelengths, the monochrometer carrying said diffraction grating G is not necessary, and instead, monochromatic light emitted through filters or emitted from monochromatic lamps can be employed.

The light beam emitted from monochrometer M is periodically intercepted at a predetermined frequency, for instance, 60 Hz, and at predetermined intercepting time, for instance, 1/240 second, by chopper blades 51, 52 passing through their upper positions and rotated by a motor 50. A second light beam emitted from a second light source 53 is chopped by the chopper blade passing through its lower position completely in synchronous phase with the interception of the first light beam. A photoelectric transducer 54, which comprises a device such as a phototransistor, receives the chopped second light beam and supplies its output pulse signal to a timing-pulse-generator PC in such a way that a pulse continues during the period in which each chopper blade intercepts the second light beam.

An unknown sample cell 2 filled with unknown sample material 2' and reference sample cell 3 filled with reference sample material 3' are mechanically connected with each other. FIG. 1 shows the situation where the reference sample cell 3 is in the light path, while unknown sample cell 2 is out of the path. The unknown sample cell 2 and reference sample cell 3 are so arranged that either one of them can put into the light path by conventional movement devices, generally indicated by 30. The optical system described above comprises known condenser lenses, and, therefore they are omitted from the drawings. The light beam coming through the reference cell 2 or the unknown cell 3 is led to a detection means or transducer means, for instance, a photomultiplier D. The photomultiplier D comprises an anode 6, a cathode 4 and several dynodes (not shown). Respective voltages are applied to these electrodes from a variable voltage supply V through a resistive voltage divider 5. The output signal from the photomultiplier D is impressed on the first input terminal $A_1$ of a D.C. differential amplifier A and the output signal of the amplifier A is indicated on an absorption meter 7.

The output signal a the D.C. differential amplifier A is also impressed across operates resistor 63 through an electronic sampling switch 59 which operates under the control of the control signal from the pulse-generator PC. The pulse component of this output signal is transmitted to the input terminal of a pulse amplifier PA through a capacitor 64. The pulse amplifier is so constituted as to have an output signal having the same phase with that of the input signal. Across both ends of a resistor 66 is connected an electronic switch 58 which operates under the control of the control signal from the pulse-generator PC. The output signal of said pulse amplifier PA is impressed across the resistor 66 through a capacitor 65. The voltage across the resistor 66 is transferred through a smoothing circuit consisting of a resistor 67 and capacitor 68 to the second input terminal $A_2$ of the D.C. differential amplifier A. In the D.C. differential amplifier, the first input terminal $A_1$ is the negative input terminal to which the output signal of the photomultiplier D is impressed in negative voltage. The second input terminal $A_2$ is the positive input terminal to which the signal originating from the sampling made by the electronic switch 59 is impressed through the pulse amplifier PA, D.C.-restoration circuit 65–66–58 and smoothing circuit 67–68.

The output signal from the amplifier A is led to one of two input terminals of a differential amplifier Ad through an electronic switch 60 which operates under control of the controlling signal from the pulse generator PC, and further through contact a of switch 8 which is ganged with a switch 9.

A voltage holding capacitor 61 is connected across ground and the junction point between the electronic switch 60 and the contact a of the switch 8. The holding capacitor 61 smooths the pulse signal at the electronic switch 60 and holds the smoothed voltage. Thus, although the signal at the point 62 contains a pulse component having a frequency such as 60 Hz, the absorption meter 7 does not respond to such pulse component and indicates only the D.C. component.

Figure 2:
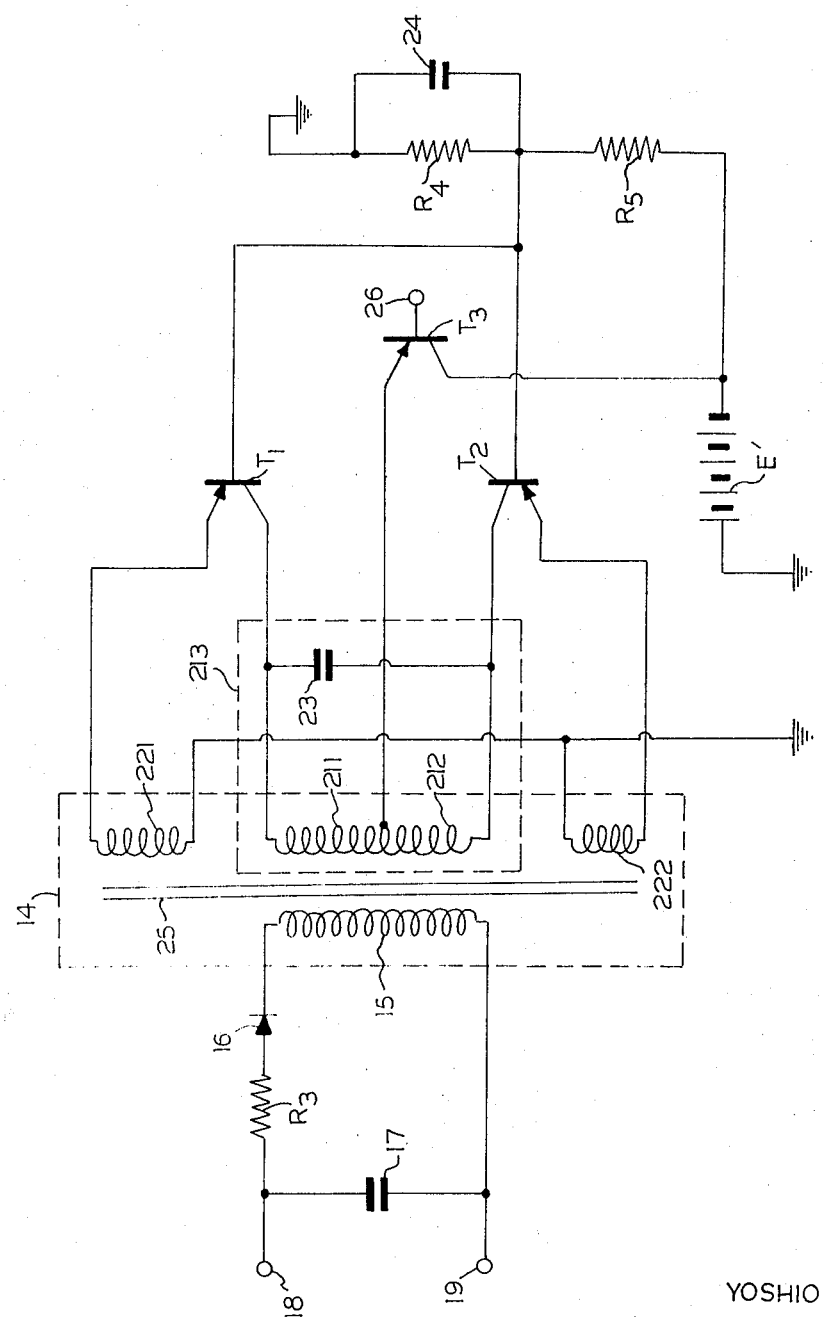
FIG. 2 is a circuit diagram of a practical example of the photomultiplier voltage supply for the spectrophotometer shown in FIG. 1.

Voltage from standard voltage source E is applied to the other input terminal of the differential amplifier Ad through contact a of switch 9. This voltage from the standard voltage source E acts as a standard for adjusting the system in such a manner that pointer 10 of the absorption meter 7 points correctly on the calibrated standard scale 11. The output signal of the differential amplifier Ad is led to the input terminal of the variable voltage supply V, controls output voltage of the variable voltage supply V, controls output voltage of the variable voltage supply V, and hence controls the voltage to the dynodes of photomultiplier D. The output of the variable voltage supply V is also applied across the series-connected resistors $R_1$ and $R_2$. The voltage of the junction r between the resistors $R_1$ and $R_2$ is led to the contact b of the switch 8, and also led to the contact b of the switch 9 through a switch 12. To the contact b of the switch 9 is also connected a capacitor 13, which, when the switch 12 is closed, is charged with the voltage across the resistor $R_2$, i.e., with a voltage proportional to the voltage supply to the dynodes of the photomultiplier D. That is to say, the output voltage of the variable voltage supply V supplied to each dynode of the photomultiplier D is divided by a suitable ratio determined by the resistance values of resistor $R_1$ and $R_2$, for the sake of convenient handling, and memorized in the capacitor 13. The variable voltage supply V CAN CONSIST of for instance, a transistor oscillator, the output of which is controlled by a controlling signal, and of a rectifier-smoothing circuit for obtaining direct current voltage from the oscillator output. FIG. 2 shows one example of such a variable voltage supply. In this variable voltage supply, transformer 14 comprises primary coils 211 and 212, secondary coil 15 and feedback coils 221 and 222. Primary coils 211 and 212 form a resonance circuit 213 together with the capacitor 23, which is connected across the series-connected primary coils 211 and 212. One end of each of feedback coils 221 and 222 is connected to the emitter of respective transistors $T_1$ and $T_2$, and to the collectors of these transistors are connected the respective sides of resonance circuit 213. The base of each transistor $T_1$ and $T_2$ is connected to a bias voltage supply obtained by dividing voltage of source E' by resistors $R_4$ and $R_5$. The other ends of each of feedback coils 221 and 222 are connected to the positive terminal of the source E' through ground. The junction of primary coils 211 and 212 and the negative terminal of source E' are connected through the emitter-collector circuit of a transistor $T_3$ for oscillation control, and the output signal of said differential amplifier Ad is fed to the base of the transistor $T_3$ through the terminal 26. Therefore, transistors $T_1$ and $T_2$ form a push-pull oscillator, the collector voltages of which are controlled by transistor $T_3$. High voltage output obtained from a secondary coil 15 of the transformer 14, due to the oscillation of said oscillator circuit, is rectified by a diode 16 and smoothed by a smoothing circuit composed of a resistor $R_3$ and a capacitor 17, and fed to the positive terminal 19 and negative terminal 18. Said positive terminal 19 is grounded, while the potential at the negative terminal 18 is fed to the photomultiplier D and series-connection of resistors $R_1$ and $R_2$ through the junction 20. The output voltage obtained from the terminals 18 and 19 of the variable voltage supply V is lowered by the further voltage drop in the transistor $T_3$ when the controlling signal to the input terminal 26 is reduced, and vice versa when the controlling signal is increased.

Absorption measurement with the spectrophotometer constructed as set forth above is carried out as follows:

First, reference sample cell 3 is inserted into the light path, switch 12 is closed, and switches 8 and 9 are thrown so that they contact the respective *a* contacts. Light radiated from the light source 1 is led through the incident slit $S_1$ into the monochrometer M, reflected by concave mirror $m_1$ and led to the grating G. The spectral light from the grating G is reflected by the second mirror $m_2$ and led to the emitting slit $S_2$. Light emitted through the emitting slit $S_2$ is monochromatic light. This monochromatic light beam is chopped by the chopper blades 51, 52 at a predetermined chopping frequency, and the chopped light beam is directed to the reference sample cell 3 and to the reference sample 3' in it. The reference sample 3' transmits light of a particular intensity depending on the absorption or the concentration of the sample. This transmitted light is then led to the photomultiplier D which produces at its anode an electric output signal corresponding to the intensity of light transmitted by the sample 3'.

The output signal from the anode of the photomultiplier D is amplified by the D.C. differential amplifier A and, through the output terminal 62, is supplied to the absorption meter 7 which indicates the absorption coefficient of the reference sample 3'. The pulse generator PC sends respective control signals to the electronic switches 58, 59 and 60 through respective output terminals 56, 55 and 57. The pulse generator PC is so constituted as to generate said control signals in the following phase relation as shown in detail in FIG. 3.

The signal sent out from the output terminal 55 is composed of pulses, each of which rises up shortly after the rise-up of each input pulse to the generator PC, and falls down just prior to the fall-down of the same input pulse.

During the duty-time (or mark-time) of each pulse at the terminal 55, the switch 59 closes and samples the signal appearing at the point 62.

Each pulse sent out from the terminal 56 rises up shortly after the rise-up of the output pulse from the terminal 55, and falls down just prior to the fall-down of the same output pulse.

During the duty-time (or mark-time) of each pulse impressed to the terminal 56, the switch 58 closes and clamps the output signal of the pulse amplifier PA so that the peak level of the output signal becomes zero.

Each pulse sent out from the terminal 57 rises up when each input pulse to the generator PC falls down, and falls down just prior to the rise-up of the next input pulse to the generator PC.

During the duty-time (or mark-time) of each pulse at terminal 57, the switch 60 closes.

As a consequence of the above-mentioned phase arrangement, the output signal of the D.C. differential amplifier A obtainable at the point 62 is sampled by the electronic switch 59 for each period during the time the light beam from the monochrometer M is intercepted by chopping blades 51, 52 imparting the sampled voltage to the resistor 63. Accordingly, the voltage across the resistor 63 is zero when the voltage at the point 62 is zero. When the voltage at the point 62 deviates to positive or negative in the dark period, a positive or negative pulse signal having a voltage in proportion to the degree of the deviation is obtained across the resistor 63, respectively. Such pulse signal is imparted through the capacitor 64 to the pulse amplifier PA, and the amplified output signal is imparted across the resistor 66 through the capacitor 65. Due to the electronic switch 58, the signal across the resistor 67 becomes a D.C.-restoration signal in which the peaks at the duration of the pulse from the terminal 56 are clamped to zero volts. In this signal, the D.C. component is proportional to the height of the pulse of the output signal of the pulse amplifier PA. The signal across the resistor 66 is smoothed by the resistor 67 and capacitor 68, and then impressed to the input terminal $A_2$ of the D.C. differential amplifier A. Thus, the amplifier A, switch 59, resistor 63, capacitor 64, amplifier PA, capacitor 65, electronic switch 58, the resistor 67 and the capacitor 68 constitute a feedback circuit which works as follows:

In case the voltage of the point 62 is positive, the signal pulse imparted to the input terminal of the pulse amplifier PA becomes a positive-going pulse, thereby making the output pulse of the pulse amplifier PA also positive-going. Since the phases of operation of electronic switches 58 and 59 are arranged as mentioned above, the pulses at the junction point 70 between the resistor 66 and the capacitor 65 become negative-going. Consequently, a substantially D.C. voltage of negative polarity is imparted to the second input terminal $A_2$ of the D.C. differential amplifier. This negative voltage to the terminal $A_2$ restores the output voltage of the amplifier A to zero at the interception of the monochromatic light by the chopper blades. In case the voltage of the point 62 becomes negative, the reverse occurs.

Thus, an automatic restoring of the output voltage of the amplifier to zero at the interception of monochromatic light is obtainable. Such automatic control is obtainable at any voltage imparted to the transducer D. This is specially useful for the spectrophotometer of the present invention, wherein the output signal from the output terminal 62 for the measurement of reference sample is standardized by varying the supply voltage to the transducer D. Provided the above-mentioned automatic control is not furnished, in case the voltage applied to its transducer changes, the dark current of the transducer also changes, and therefore, the output voltage of the D.C. differential amplifier deviates from zero.

Said voltage of output terminal 62 is also imparted to the capacitor 61 through the electronic switch 60. On account of the above-mentioned phase arrangement of the electronic switches, the voltages sampled by the switch 60 and then held by the capacitor 61 are proportional to the output signals of the transducer D for input lights through either the reference cell or sample cell.

This invention has the advantage that not only the compensation for the dark current of the transducer but also the compensation for the off-set of the D.C. differential amplifier are obtainable.

The output signal from anode 6 of the photomultiplier D is applied to one of the input terminals of the differential amplifier Ad through the contact "a" of the switch 8. To the other input terminal of the differential amplifier is applied through the contact "a" of the switch 9 the voltage of the standard voltage source E. Therefore, when the output signal from the photomultiplier D is lower than the predetermined level and consequently, the output voltage from the amplifier A is lower than the voltage of the standard voltage source E, the output voltage from the differential amplifier Ad, i.e., the input voltage to the input terminal 26 of the variable voltage supply V increases, and as a result, a high voltage output appears across terminals 18 and 19, and the dynode voltage of the photomultiplier D increase. Accordingly, the output signal from the photomultiplier D impresses owing to the increase of its sensitivity. On the contrary, when the output signal from the photomultiplier D is higher than the predetermined level, and the output voltage of the amplifier A becomes higher than the voltage of the standard voltage source E, the output voltage of the differential amplifier Ad, i.e., the voltage at the input terminal 26 of the variable voltage supply V decreases, and accordingly, a lower voltage output appears across terminals 18 and 19, and the dynode voltage of the photomultiplier D decreases. Accordingly, the output signal of the photomultiplier D is lowered owing to the decrease of its sensitivity. The voltage of the variable voltage supply V is in equilibrium at the time when the voltage of the standard voltage source E is equal to that of the amplifier A. Consequently, variable voltage supply V supplies the photomultiplier D with a calibrated voltage corresponding to the absorption coefficient which the pointer 10 of the absorption METER 7 indicates on the standard scale; i.e., at 100 percent when the reference sample cell 3 is put in the light path. The output voltage of the variable voltage supply V is set and memorized during this time by the capacitor 13 as a form of voltage divider by resistors $R_1$ and $R_2$.

Then, the switch 12 is opened, the reference sample cell 3 is moved out of the light path, and the unknown sample cell 2 filled with an unknown sample 2' is put into the light path, and simultaneously, the switches 8 and 9 are thrown into contact with the contacts $b$. It is desirable to gang the switches 8 and 9 and 12 with the movement of the reference sample cell 3 and the unknown sample cell 2, by any suitable means for instance linkage, generally represented by 31 for the purpose of speeding-up the measurement. In conjunction with the above-mentioned switching and cell substitution, the voltage of the point $r$, which was previously obtained when the reference sample 3' was in the light path, is supplied to one input terminal of the differential amplifier Ad through the contact "$b$" b of the switch 9, and the voltage of the point $r$, which is now obtained for the unknown sample 2' in the light path, is supplied to the other input terminal of said differential amplifier Ad through the contact 37 $b$" b of the switch 8. Therefore, the output voltage of the variable voltage supply V is stabilized at a value such that the voltage of the point r becomes equal to the voltage memorized in the capacitor 13. Consequently, the voltage between the two ends of the series-connection of the resistors $R_1$ and $R_2$, and therefore the voltage supplied to the dynodes of the photomultiplier D becomes equal to those established in the calibration period when the reference sample cell 3 was in the light path. Accordingly, by measuring the light transmitted by the unknown sample 2', which is the monochromatic light from the monochometer M, at said calibrated voltage supplied to the dynodes of the photomultiplier D, the spectrophotometer gives the absorption coefficient of the unknown sample measured at the same sensitivity as that for reference sample 3'.

Therefore it is possible to obtain the absorption coefficient, as a ratio of the light absorption of the unknown sample to the light absorption of the reference sample, by direct reading of the meter 7. If said differential amplifier Ad is constituted so as to have a very high input impedance, the time constant determined by this input impedance and the capacity of the capacitor 13 becomes very large, and makes negligible the adverse effect caused by the voltage attenuation of the capacitor 13 during the period in which the unknown sample is measured.

As is described above in detail, the spectrophotometer of the present invention makes the manual adjustment of the photometric circuit unnecessary, even when the reference sample is replaced, by means of the automatic calibration of the sensitivity of the photometric circuit. Accordingly, the spectrophotometer of the present invention is free from the drawback that it induces errors which are inevitable in the manual adjustment, and has the advantage of enabling quicker measurement of absorption coefficients.

What is claimed is:

1. A spectrophotometer comprising means for emitting a monochromatic light beam; means for alternatively inserting a reference sample and an unknown sample into the path of said light; transducer means positioned to receive the light from the samples for producing an electric output signal corresponding to the intensity of light transmitted through said samples, measuring means coupled to said electric signal producing means for measuring the intensity of the said output signal; a differential amplifier having a first input terminal to receive the output signal of the transducer means, means for periodically intercepting said monochromatic light beam; a first sampling means for sampling the output signal of the differential amplifier during the period of the interception of said light beam; circuit means including a pulse amplifier circuit and a smoothing circuit for supplying a D.C. control voltage to a second input terminal of said differential amplifier from the output signal of said first sampling means; a second sampling means for sampling the output signal of said differential amplifier during the period said light beam is received by said transducer means; means for detecting the interception timing to generate controlling pulse signals and supply where outputs of the transducer means and the standard voltage supply becomes equal, memory means for memorizing output voltage of the variable voltage si second controlling means for controlling said variable voltage supply to attain a second controlled condition where the output of the variable voltage supply becomes equal to the output memorized in said memory means, and switching means for switching from said first controlled condition to said second controlled condition.

2. A spectrophotometer comprising means for emitting monochromatic light; means for alternatively inserting a reference sample and an unknown sample into the path of said light; a photomultiplier for producing an electric output signal corresponding to the intensity of light directed into it and positioned in said light path to receive light from said samples; a first differential amplifier having a first input terminal to receive said output signal of said photomultiplier; indicating means coupled to said first differential amplifier for indicating the intensity of the output signal of said photomultiplier; means for periodically intercepting said monochromatic light beam; a first sampling means for sampling the output signal of said first differential amplifier during the period of the interception of said light beam; circuit means including a pulse amplifier circuit and a smoothing circuit for supplying a D.C. control voltage to a second input terminal of said first differential amplifier from the output signal of said first sampling means; a second sampling means for sampling the output signal o said first differential amplifier during the period said light beam is received by said photomultiplier; means for detecting the interception timing to generate controlling pulse signals and supply them to said first and second sampling means and said circuit means; a variable voltage supply for supplying high direct correct voltage to the dynodes of said photomultiplier and in which the supply voltage can be varied for the control of the sensitivity of the photomultiplier in accordance with a controlling signal, a second differential amplifier coupled to said voltage supply for supplying a control signal to said variable voltage supply in accordance with the difference between signals applied to input terminals thereof; a standard voltage source coupled to said second differential amplifier for supplying standard voltage to a first input terminal thereof for adjusting the sensitivity of said photomultiplier to a standard sensitivity when said reference sample is inserted in said light path; connecting means connecting the photomultiplier to a second terminal of said second differential amplifier for applying thereto a voltage based on the output of said photomultiplier during a calibration period when said standard voltage is applied to said first terminal thereof; capacitor means; and switching means connecting said capacitor means to the output terminal of said variable voltage supply during the calibration period for memorizing output voltage of the variable voltage supply during said calibration period and connecting said capacitor and the output terminal of said variable voltage supply to the input terminals of said second differential amplifier and disconnecting said standard voltage source and said connecting means from said terminals during the measuring period when said unknown sample is placed in the light path instead of the reference sample.

3. A spectrophotometer as claimed in claim 2 wherein the variable voltage supply comprises a transistorized push-pull oscillator having a pair of transistors and an oscillation level controlling transistor inserted in the collector circuit of said pair of transistors.

4. A spectrophotometer as claimed in claim 2 wherein said means for alternately inserting said cells in the path of said light is connected with said switching means so that said switching means is actuated when said cells are changed. for coupled signal, amplifier having periodically of differential from sampling means, period transducer means,

* * * * *